US011550446B2

(12) United States Patent
Chen et al.

(10) Patent No.: US 11,550,446 B2
(45) Date of Patent: Jan. 10, 2023

(54) SYSTEMS AND METHODS FOR VIEWING WEBPAGES IN EXTENDED REALITY ENVIRONMENTS

(71) Applicant: Samsung Electronics Company, Ltd., Suwon Si (KR)

(72) Inventors: Winston Chen, Melrose, MA (US); Laszlo Gombos, Winchester, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 16/945,628

(22) Filed: Jul. 31, 2020

(65) Prior Publication Data

US 2021/0311594 A1   Oct. 7, 2021

Related U.S. Application Data

(60) Provisional application No. 63/005,893, filed on Apr. 6, 2020.

(51) Int. Cl.
*G06F 3/0482* (2013.01)
*G06F 3/0483* (2013.01)
(Continued)

(52) U.S. Cl.
CPC .......... *G06F 3/0482* (2013.01); *G06F 3/0483* (2013.01); *G06F 40/221* (2020.01);
(Continued)

(58) Field of Classification Search
CPC .... G06F 3/0482; G06F 3/0483; G06F 40/221; G06F 3/012; G06F 3/013; G06F 3/017; G06F 3/011; G06F 40/143; G06F 3/04847; G06F 16/954; G06F 3/04815; G06F 9/451; G06F 16/953; G06F 16/958
See application file for complete search history.

(56) References Cited

U.S. PATENT DOCUMENTS 10,817,648 B1 * 10/2020 Ghiaus ................... G06T 19/20
2013/0285884 A1   10/2013 Yamamoto
(Continued)

FOREIGN PATENT DOCUMENTS

KR         20150078242         7/2015

OTHER PUBLICATIONS

International Search Report and Written Opinion dated Jul. 1, 2021 for International Application No. PCT/KR2021/004256, Jul. 1, 2021.

*Primary Examiner* — Phuong H Nguyen

(57) ABSTRACT

A method includes retrieving a webpage requested by an extended reality (XR) web reader. The method further includes determining one or more content elements of the webpage and one or more menu elements of the webpage. The menu elements may comprise navigational controls for accessing additional content linked to the webpage. The method further includes mapping the one or more menu elements to one or more pre-defined menu interfaces of the XR web reader. The method further includes presenting the webpage via the XR web reader. The one or more content elements may be presented on one or more first layers of an interface of the XR web reader, and the one or more pre-defined menu interfaces may be presented on one or more second layers of the interface of the XR web reader.

20 Claims, 10 Drawing Sheets

(51) Int. Cl.
*G06F 40/221* (2020.01)
*G06F 3/01* (2006.01)
(52) U.S. Cl.
CPC .............. *G06F 3/012* (2013.01); *G06F 3/013* (2013.01); *G06F 3/017* (2013.01)

(56) References Cited

U.S. PATENT DOCUMENTS

| | | |
|---|---|---|
| 2014/0364212 A1 | 12/2014 | Osman |
| 2015/0067580 A1 | 3/2015 | Um |
| 2015/0091942 A1 | 4/2015 | Ko |
| 2017/0322911 A1* | 11/2017 | Kim ...................... H04N 13/293 |
| 2018/0101223 A1 | 4/2018 | Ishihara |
| 2019/0005716 A1* | 1/2019 | Singh ....................... G06T 15/80 |
| 2019/0205357 A1 | 7/2019 | Lin |
| 2019/0238648 A1 | 8/2019 | Goel |
| 2019/0324270 A1 | 10/2019 | Stellmach |
| 2019/0371279 A1 | 12/2019 | Mak |

* cited by examiner

SYSTEMS AND METHODS FOR VIEWING WEBPAGES IN EXTENDED REALITY ENVIRONMENTS

PRIORITY

This application claims the benefit under 35 U.S.C. § 119(e) of U.S. Provisional Patent Application No. 63/005,893, filed 6 Apr. 2020, which is incorporated herein by reference.

TECHNICAL FIELD

This disclosure relates generally to extended reality (XR) systems, and in particular relates to viewing webpages in an XR environment.

BACKGROUND

An extended reality (XR) system may generally include a computer-generated environment and/or a real-world environment that includes at least some XR artifacts. Such an XR system or world and associated XR artifacts typically include various applications (e.g., video games and the like), which may allow users to utilize these XR artifacts by manipulating their presence in the form of a computer-generated representation (e.g., avatar). In typical XR systems, image data may be rendered on, for example, a lightweight, head-mounted display (HMD) that may be coupled through a physical wired connection to a base graphics generation device responsible for generating the image data. In some instances, it may be desirable to view other content such as webpages on the XR system (e.g., via a web reader application). However, webpages are typically designed to be viewed in a two-dimensional space (e.g., on the screen of a laptop, smart phone, or tablet). It may be thus useful to provide techniques to improve the viewing of webpages on XR systems.

DESCRIPTION OF EXAMPLE EMBODIMENTS

Figure 1:
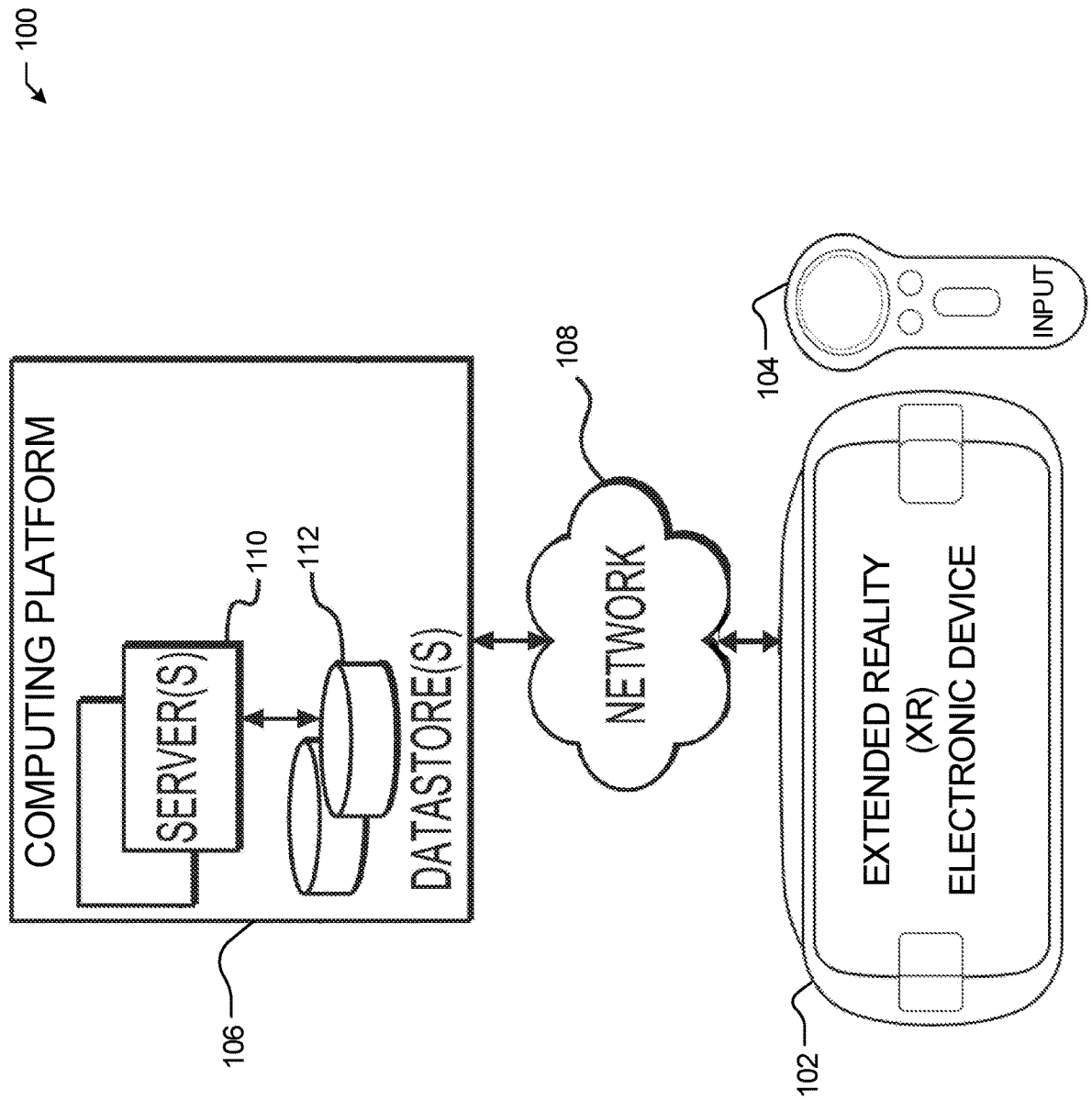
FIG. 1 illustrates an example extended reality (XR) system.

Particular embodiments described herein are directed toward parsing a webpage and re-mapping elements of the webpage on a menu. In particular embodiments, a computing system may retrieve a webpage that has been requested by an extended reality (XR) web reader. A web reader may be a web browser, a webview application (e.g., a browser component embedded inside another application, such as an email, messaging, or social application), or any application or component which is capable of parsing and rendering web content (e.g., HTML, JavaScript, or CSS). The computing system may then determine one or more content elements and one or more menu elements of the webpage. The one or more menu elements may comprise navigational controls for accessing additional content linked to the webpage. The one or more content elements may comprise the substantive content of the webpage, such as text, image, or video information presented via the webpage (e.g., within a main content section of a webpage), either directly or embedded in the webpage. The computing system may then map the one or more menu elements to one or more pre-defined menu interfaces. A pre-defined menu interface may be a menu interface of the XR web reader, a menu interface of an XR operating system (OS), a hardware menu of an XR device or device controller, or a menu interface of a touch-bar. The computing system may then present the webpage via the XR web reader, wherein the one or more content elements may be presented on one or more first layers of an interface of the XR web reader, and wherein the one or more pre-defined menu interfaces may be presented on one or more second layers of the interface of the XR web reader.

In particular embodiments, the computing system may determine a focus of a user of the XR web reader. The focus of the user may indicate one or more elements of the webpage that the user wishes to interact with. Based on the focus of the user, the computing system may modify characteristics of the one or more predefined menu interfaces. The characteristics of the one or more pre-defined menu interfaces may comprise one or more of a visibility of the menu interface or a position of the menu interface. In particular embodiments, determining a focus of the user may be based on one or more of a gaze of the user, a head position of the user, or a gesture of a user.

In particular embodiments, the computing system may determine the one or more content elements of the webpage and one or more menu elements of the webpage by accessing a document object model (DOM) of the webpage. A DOM is a representation of a webpage in which each part of the webpage is represented in a hierarchical structure. As an example and not by way of limitation, a DOM may contain information about the structure of the webpage and the relationships between elements, allowing a web reader to automatically parse and display the webpage based on the DOM. In particular embodiments, the computer system may then parse the DOM to identify one or more candidate elements. As an example and not by way of limitation, a candidate element may include an element identified as belonging to the DOM structure of the webpage. In particular embodiments, the one or more candidate elements may be collected using a breadth first search (BFS) algorithm. A BFS algorithm is a method of traversal of a hierarchical structure of data, wherein the algorithm iteratively explores the data elements of a hierarchical structure by evaluating the data elements from closest to furthest from a parent data element. Each of the one or more candidate elements may be categorized into either a content element or a menu element. The categorizing may be based on one or more of a position of the candidate element, a height to width ratio of the candidate element, one or more HTML tags associated with the candidate element, one or more HTML role attributes of the candidate element, one or more HTML tabindex attributes of the candidate element, or a parent-child relationship of the candidate element with one or more other candidate elements.

In particular embodiments, the computer system may determine that the one or more candidate elements cannot be categorized into either contents or menu elements. As an example and not by way of limitation, a webpage which uses a DOM structure that is unfamiliar to the computer system may be difficult to categorize without additional context on the structure of the webpage elements. In general, web developers do not conform to any one element structure, and as a result, element structure varies from webpage to webpage. As an example and not by way of limitation, a webpage may or may not use the <a> attribute to denote a menu element, and may or may not use the <main> attribute to denote a content element of a webpage. Thus, the computer system may be unable to categorize identified elements as either content or menu elements. The computer system may then retrieve one or more comparison webpages within the same domain as the webpage requested by the XR web reader. The computer system may then access the DOM of each of the one or more comparison webpages. The computer system may then parse the DOM of each of the one or more comparison webpages to collect one or more comparison elements of each of the one or more comparison webpages.

The computer system may then compare the one or more candidate elements of the webpage requested by the XR web reader to each of the one or more comparison elements of the one or more comparison webpages. In particular embodiments, the computer system may collect comparison elements corresponding to elements identified as belonging to the DOM structure of each of the one or more comparison webpages. The computer system may then determine, based on the comparison, one or more menu elements, wherein the menu elements are candidate elements that are common to one or more of the comparison webpages and to the webpage requested by the XR web reader. As an example and not by way of limitation, the computer system may determine that a candidate element belonging to the DOM structure of the webpage requested by the XR web reader also belongs to the DOM structure of one or more comparison webpages. As an example and not by way of limitation, such an element is considered common to a both the webpage requested by the XR web reader and to one or more comparison webpages. Thus, the computer system may determine that the candidate element is a menu element of the webpage requested by the XR web reader. As an example and not by way of limitation, the DOM structure of the webpage requested by the XR web reader may indicate that a candidate element belonging to the DOM structure comprises a word "Local" that should be presented near the top of the webpage. Based on the DOM structure of the webpage requested by the XR web reader alone, the categorizing algorithm may be unable to determine that candidate element comprising the word "Local" is a menu element. However, the categorizing algorithm may then collect one or more comparison elements of each of the one or more comparison webpages, wherein the DOM structure of the one or more comparison webpages indicates that a comparison element belonging to the DOM structure of each of the one or more comparison webpages comprises a word "Local" that should be presented near the top of the one or more comparison webpages. The comparison algorithm may then determine that the element comprising the word "Local" and to be presented near the top of a webpage is common to both the webpage requested by the XR web reader and to the one or more comparison webpages. Based on the comparison, the comparison algorithm may determine that the candidate element comprising the word "Local" is a menu element.

In particular embodiments, the one or more pre-defined menu interfaces of the XR web reader or the XR operating system interface comprise one or more of a video control menu or an item list menu. As an example and not by way of limitation, a video control menu interface may include controls to play, pause, rewind, or fast forward through a video. The one or more menu elements may comprise navigational controls for accessing additional content linked to the webpage. A user may control video content accessible via the webpage by interacting with one or more controls of a video control menu interface. As an example and not by way of limitation, an item list menu may comprise a list of one or more menu elements. Each of the one or more menu elements comprising the item list menu may be associated with a content element accessible via the webpage. As another example and not by way of limitation, a menu interface may comprise one or more sub-menus. In particular embodiments, the computer system may further receive instructions from the user to interact with the one or more content elements presented on the one or more first layers according to the one or more pre-defined menu interfaces presented on the one or more second layers. As an example and not by way of limitation, the user may start playing a video accessible via the webpage by selecting a "play" control from the video control menu interface. The user may select a control corresponding to play, pause, rewind, or fast forward to control the video element. In particular embodiments, the one or more pre-defined menu interfaces and the one or more content elements may be presented as an AR overlay on one or more displays of a client device. The client device may comprise a head-mounted augmented reality (AR) device. The AR overlay may be rendered on a plurality of layers on a semi-transparent AR display over a real-world display. In particular embodiments, the client device may comprise a head-mounted virtual reality (VR) device, and wherein the one or more pre-defined menu interfaces and the one or more content elements are presented as objects within a VR space on one or more displays of the VR device. The VR objects may be rendered on a plurality of layers within the VR space.

As used herein, "extended reality" (XR) may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. As an example and not by way of limitation, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Further, as used herein, it should be appreciated that "extended reality" may be associated with applications, products, accessories, services, or a combination thereof, that, for example, may be utilized to create content in extended reality and/or utilized in (e.g., perform activities) in extended reality. Thus, "extended reality" content may be implemented on various platforms, including a head-mounted display (HMD) device connected to a host computer system, a standalone HIVID, a mobile device or computing system, or any other hardware platform capable of providing extended reality content to one or more viewers.

FIG. 1 illustrates an example extended reality (XR) system 100, in accordance with presently disclosed embodiments. In particular embodiments, the XR system 100 may include an XR electronic device 102, an input device 104, and a computing platform 106. In particular embodiments, a user may wear the XR electronic device 102 that may display visual extended reality content to the user. The XR electronic device 102 may include an audio device that may provide audio extended reality content to the user. In particular embodiments, the XR electronic device 102 may include one or more cameras which can capture images and videos of environments. The XR electronic device 102 may include an eye tracking system to determine the vergence distance of the user. In some embodiments, the XR electronic device 102 may include a head-mounted display (HDM), which may be an enclosed headset as illustrated in FIG. 1, though this illustration is not intended to be limiting. The XR electronic device 102 may include other types of HMDs, including non-enclosed headsets, glasses, handheld devices like smart phones and tablets, or any other suitable device for displaying XR content. The XR electronic device 102 may include one or more displays, which may be opaque, semi-transparent, or transparent. The input device 104 may include, for example, a trackpad and one or more buttons. The input device 104 may receive inputs from the user and relay the inputs to the computing platform 106 and/or the XR electronic device 102. In particular embodiments, the XR electronic device 102 may be coupled to the computing platform 106 via one or more wireless networks 108. In particular embodiments, the computing platform 106 may include, for example, a standalone host computing system, an on-board computer system integrated with the XR electronic device 102, a mobile device, or any other hardware platform that may be capable of providing extended reality content to and receiving inputs from the input device 104. In particular embodiments, the computing platform 106 may include, for example, a cloud-based computing architecture (including one or more servers 110 and data stores 112) suitable for hosting and servicing XR applications or experiences executing on the XR electronic device 102. For example, in particular embodiments, the computing platform 106 may include a Platform as a Service (PaaS) architecture, a Software as a Service (SaaS) architecture, and an Infrastructure as a Service (IaaS), or other similar cloud-based computing architecture.

Figure 2:
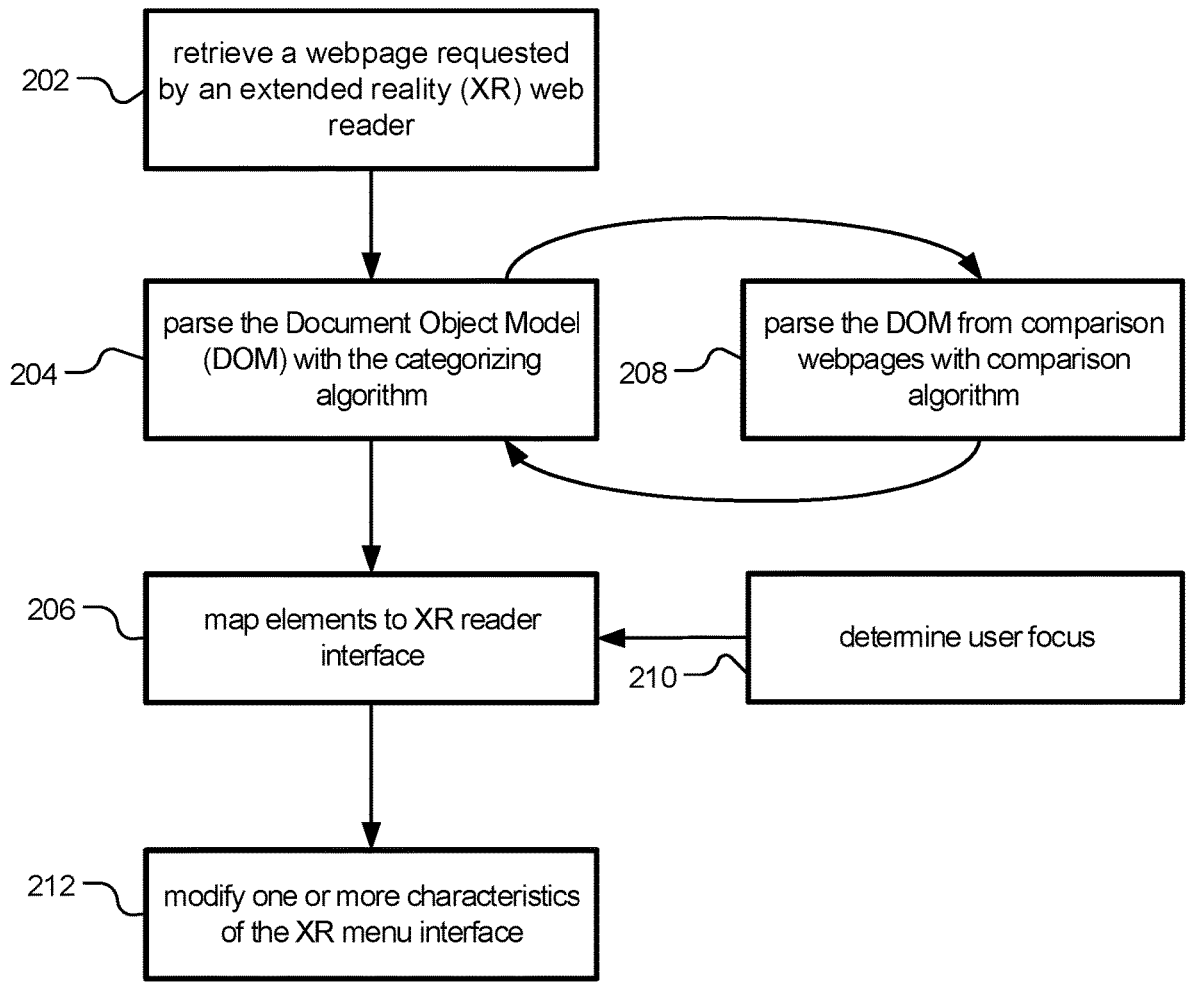
FIG. 2 illustrates an overview diagram of an example process for presenting a webpage via an XR web reader.

FIG. 2 illustrates an overview diagram of an example process for presenting a webpage via an XR web reader. The method 200 may be performed utilizing one or more processing devices (e.g., XR electronic device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

A method is provided for presenting a webpage via an XR web reader. An XR web reader may request a webpage for presenting via an interface of the XR web reader. Webpages are traditionally designed to be viewed on 2D screens (desktop, smartphone, and tablets), but webpages are not generally optimized for presenting via an XR web reader, which may incorporate multi-dimensional spatial computing. In particular embodiments, webpages may be parsed into menu elements (headers, side menus and footers that allow the user to navigate the webpage) and content elements (text, videos, images, etc.). Menu elements and content elements of a webpage may be decoupled and presented in a different configuration for the user to interact with. In general, a user may spend more time interacting with content elements than interacting with webpage menu elements. Therefore, the presentation of a webpage via an XR web reader may present menu elements in the background or hidden to avoid saturating the environment with virtual objects. The method 200 may begin at step 202 with the retrieval of a webpage requested by an extended reality (XR) web reader. The method 200 may then continue at step 204 with a categorizing algorithm. The categorizing algorithm may parse the Document Object Model (DOM) of the webpage to collect candidate elements. The categorizing algorithm may then determine which of the candidate elements are menu elements and which are content elements.

The method 200 may then continue at step 206 with the mapping of elements. Candidate elements determined to be menu elements may be mapped to a pre-determined XR menu interface. The XR menu may be a pre-defined menu interface. Candidate elements determined to be content elements may be extracted and brought into focus for presentation, while other sections of the page may be out of focus (hidden but still accessible). The content elements may also be optimized for three-dimensional presentation and interaction within the XR environment.

In particular embodiments, the categorizing algorithm may be unable to determine content elements and menu elements. In this case, the method 200 may proceed to step 208 with a comparison algorithm. The comparison algorithm may narrow the field of candidate elements by performing a comparison of candidate elements of the webpage requested by the XR web reader with candidate elements parsed from the DOM of one or more comparison webpages within the same domain as the webpage requested by the XR web reader. After performance of the comparison algorithm to determine a subset of candidate elements likely to be menu elements, the method may return to step 204, with the performance of the categorizing algorithm on the subset of candidate elements. At step 210, a focus of the user is determined. At step 212, one or more characteristics of the one or more pre-determined XR menu interfaces may be modified based on the user focus.

Figure 3:
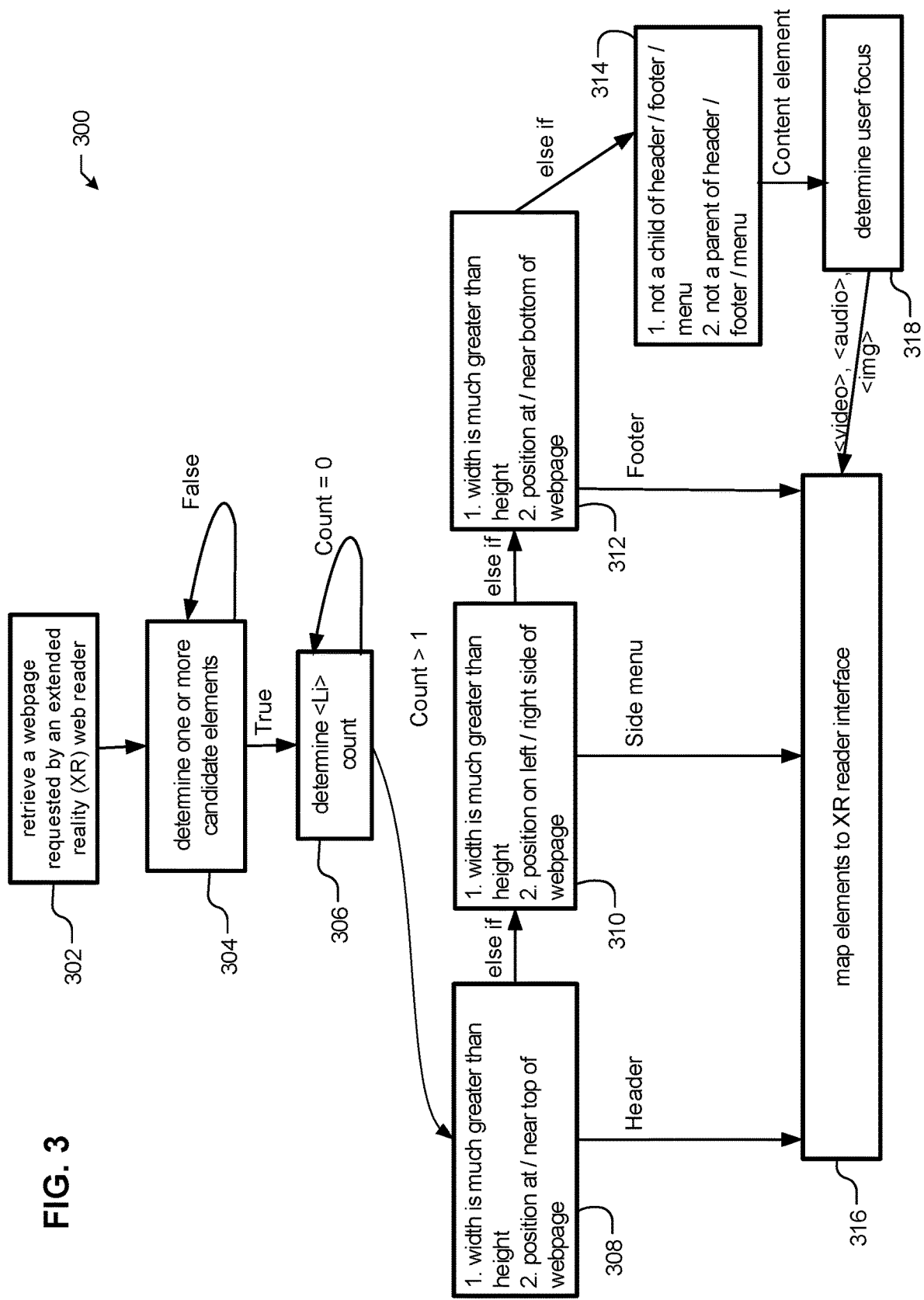
FIG. 3 illustrates a rules diagram of a method for a categorizing algorithm.

FIG. 3 illustrates a rules diagram of a method 300 for a categorizing algorithm. The categorizing algorithm, according to particular embodiments, may parse a webpage or sections of a webpage to determine one or more content elements and one or more menu elements of the webpage. The method 300 may be performed utilizing one or more processing devices (e.g., computing platform 106) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

At step 302, the categorizing algorithm, according to particular embodiments, may retrieve and parse the DOM of a webpage requested by an XR web reader. At step 304, the categorizing algorithm may perform a tree traversal of the DOM of the webpage to determine one or more candidate elements. The one or more candidate elements may be collected at step 304 using a breadth first search (BFS) type of tree traversal algorithm. The categorizing algorithm may parse the DOM and tries to categorize each of the determined candidate elements. The categorizing algorithm may base the categorization on one or more of a position of the candidate element, a height to width ratio of the candidate element, one or more HTML tags associated with the candidate element, one or more HTML role attributes of the candidate element, one or more HTML tabindex attributes of the candidate element, or a parent-child relationship of the candidate element with one or more other candidate elements.

Steps 306-314 illustrate rules for categorizing a candidate element as either a menu element or a content element based on the type of element from a list of possible types of elements. The types of elements may comprise one or more of ul, div, img, header, main, article, aside, section, other suitable element types, or any combination thereof. At step 306, the categorizing algorithm may determine the number of <li> elements ("list" elements) associated with it. At steps 308, 310, and 312, the categorizing algorithm may determine a height to width ratio of the candidate element. Also at steps 308, 310, and 312, the categorizing algorithm may determine a position of the candidate element (e.g. top of page, bottom of page, left of page, or right of page). At step 314, the categorizing algorithm may determine if the candidate element is either a child or parent of any header, footer, or menu element. According to one or more rules of the categorizing algorithm at step 308, a candidate element may be a header or a footer menu element based on one or more of an inclusion of lists (e.g. <ul> element with a plurality of <li> elements), width is much greater than height, position is near a top of the webpage. According to one or more rules of the categorizing algorithm at step 310, a candidate element may be a side menu element based on one or more of an inclusion of lists (e.g. <ul> element with a plurality of <li> elements), height is much greater than width, position is either right or left side of the webpage, or is associated with a <menu> tag. According to one or more rules of the categorizing algorithm at step 312, a candidate element may be a footer element based on one or more of an inclusion of lists (e.g. <ul> element with a plurality of <li> elements), width is much greater than height, or position is at or near a bottom of the webpage. If the candidate element is determined to be a header, footer, or side menu element, then the categorizing menu may proceed to step 316 to map the determined element. If a candidate element is determined not to be a header, footer, or side menu element, then the categorizing may proceed to step 314. According to one or more rules of the categorizing algorithm at step 314, a candidate element may be a content element based on one or more of the candidate element not being a child element of any header menu elements or side menu elements, or the candidate element not being a parent element of any header menu elements or side menu elements.

At step 316, the determined menu elements and content elements are mapped to the XR web reader interface. At step 318, a focus of the user is determined. The categorizing algorithm may be performed in response to a request to load a webpage by an XR web reader. The categorizing algorithm may be unable to determine menu elements and content elements. Webpages may not conform in structure or in HTML tag attributes. On a determination that the categorizing algorithm is unable to determine menu elements and content elements, a comparison algorithm may be performed. The comparison algorithm may narrow the field of possible DOM elements by performing a comparison of DOM elements across webpages within the same domain.

Figure 4:
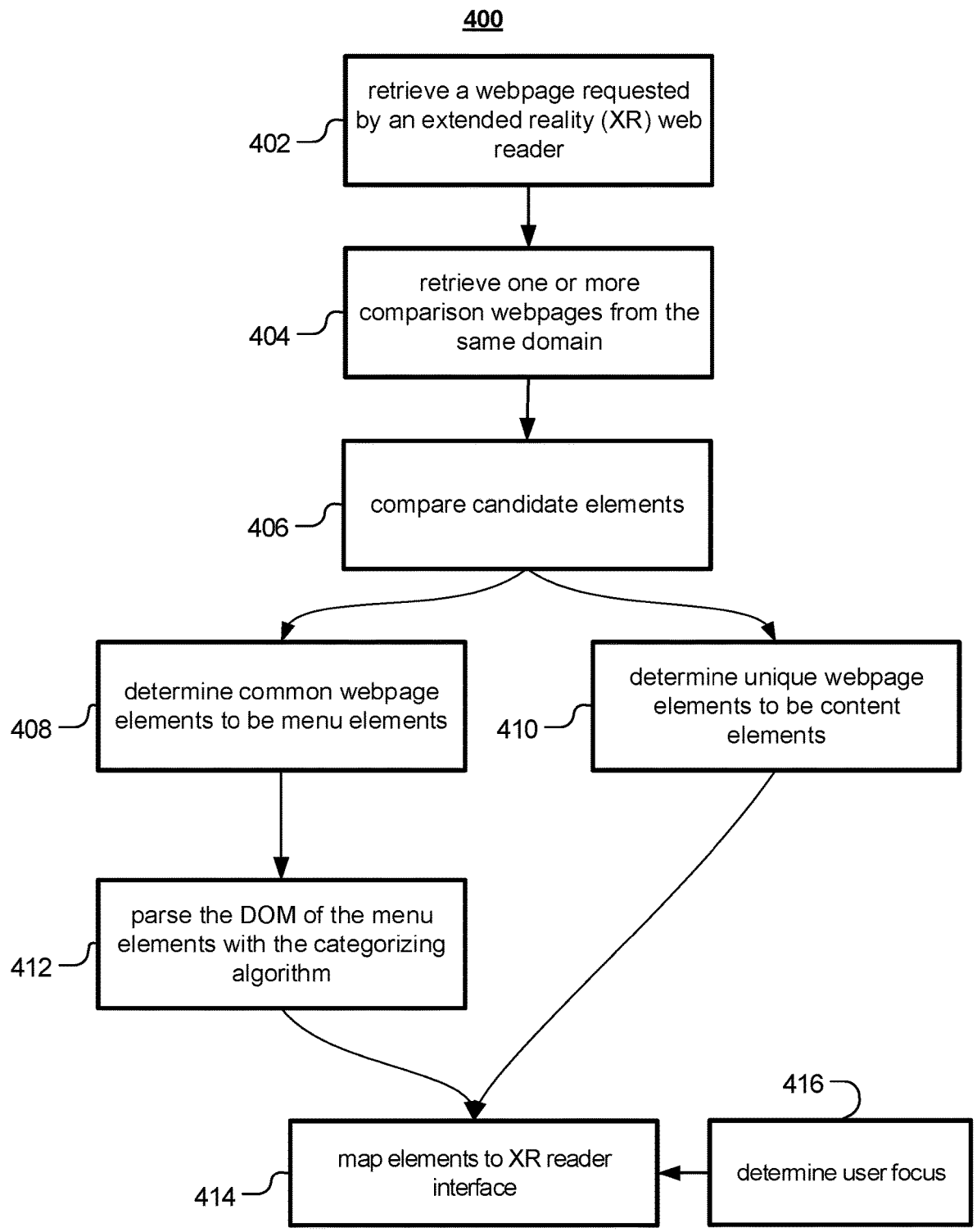
FIG. 4 illustrates a flow diagram for a comparison algorithm.

FIG. 4 illustrates a flow diagram 400 for a comparison algorithm. The comparison algorithm may be performed in response to a determination that the categorizing algorithm is unable to determine whether one or more candidate elements is a menu element and/or a content element. At step 402, the comparison algorithm, according to particular embodiments, may retrieve and parse the DOM of a webpage requested by an XR web reader to determine one or more candidate elements of the webpage. At step 404, the comparison algorithm may retrieve and parse the DOM of one or more additional webpages that are within the same domain as the webpage requested by the XR web reader. The one or more additional webpages may be used as comparison webpages. URLs of the one or more comparison webpages may be collected as a result of parsing the webpage requested by the XR web reader or, in particular embodiments, may be collected as a result of the parsing step of the categorizing algorithm. The one or more comparison webpages may be parsed to collect one or more comparison elements of each of the one or more comparison webpages. At step 406, the one or more comparison elements of the one or more comparison webpages may be compared to the one or more candidate elements of the webpage requested by the XR web reader. On webpages within the same domain, menu elements (and/or the DOM structure of menu elements) are typically common across webpages within the domain, because webpages within the same domain typically have consistent headers, footers, and menu sections. On the other hand, content elements are typically unique for each webpage within the domain. Elements that are common to one or more of the comparison webpages and to the webpage requested by the XR web reader are thus likely to be menu elements as opposed to content elements. The comparison algorithm may thus determine whether the one or more candidate elements are menu elements or content elements. At step 406, the comparison algorithm may compare candidate elements of the one or more comparison webpages to candidate elements of the webpage requested by the XR web reader. The comparison at step 406 may determine whether one or more candidate elements of the webpage requested by the XR web reader are common to the webpage requested by the XR web reader and to the one or more candidate webpages. Alternatively, the comparison at step 406 may determine that one or more candidate elements of the webpage requested by the XR web reader are unique to the webpage requested by the XR web reader. At step 408, based on the comparison, the comparison algorithm may determine common webpage elements to be menu elements of the webpage requested by the XR web reader. At step 410, based on the comparison, the comparison algorithm may determine unique webpage elements to be content elements of the webpage requested by the XR web reader. At step 412, the categorizing algorithm may be used to parse the determined menu elements of the webpage requested by the XR web reader for their menu element structure. At step 414, the determined menu elements and determined content elements of the webpage requested by the XR web reader are mapped to the XR web reader interface. At step 416, a focus of the user is determined.

Figure 5:
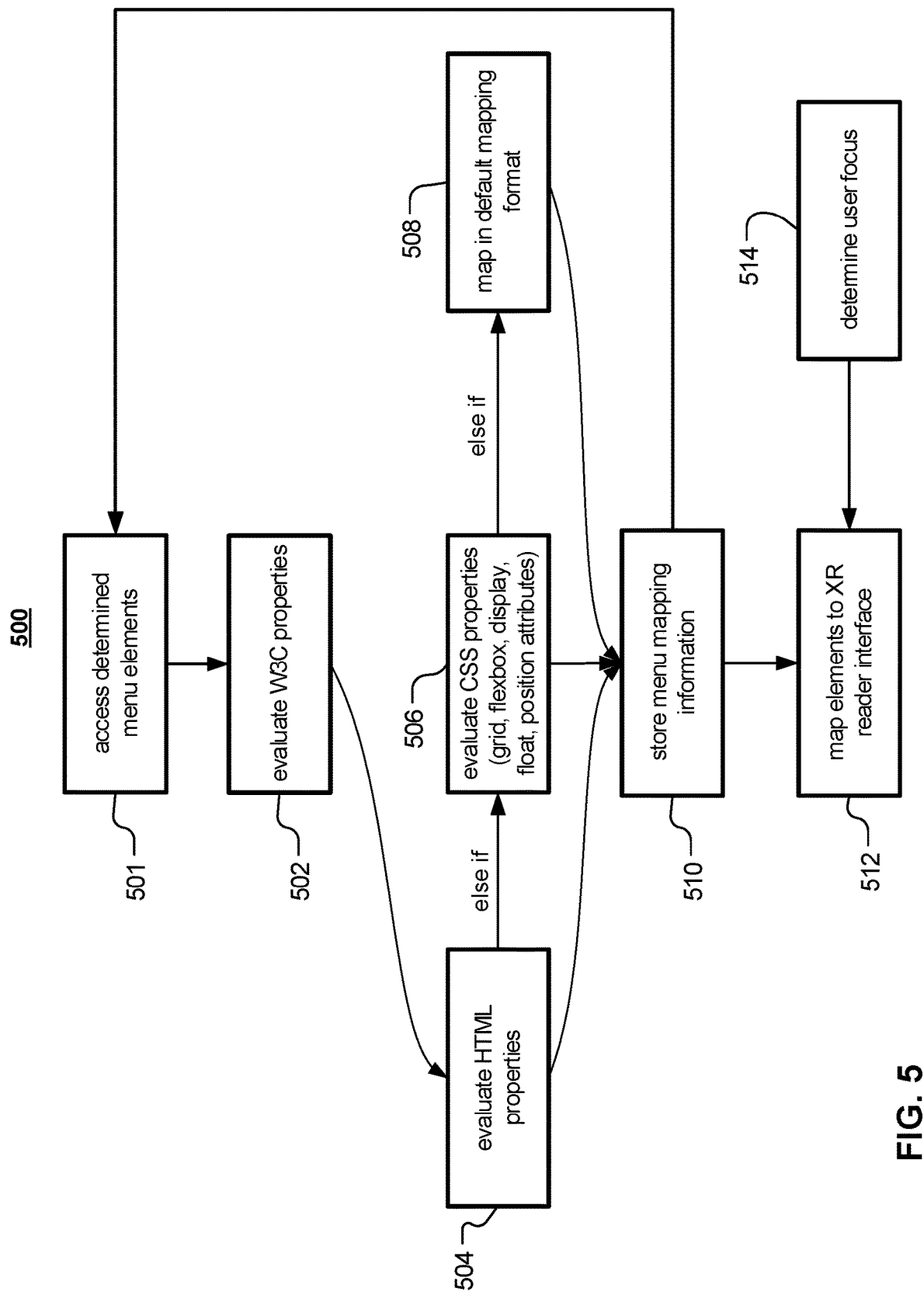
FIG. 5 illustrates a flow diagram for a method of mapping menu elements to one or more menu interfaces.

FIG. 5 illustrates a flow diagram 500 for a method of mapping menu elements to one or more menu interfaces. The one or more menu interfaces may be virtual and may be pre-determined (i.e. the layout of the menu interfaces is known). An advantage of mapping menu elements to pre-determined menu interfaces is the ease of user interaction and ability to navigate the webpage content. Developers of webpages may desire control of the webpage content and menu in order to provide a specific experience. Tools exist for developers to customize how menu elements of a webpage may be mapped to, for example, an XR web reader. As an example, the known element tag <video> contains an attribute 'controls' which may dictate the overlay of video controls on top of a video. As another example, a webpage may include an 'ar-menu' tool comprising tags for precise AR menu mapping instructions. The method 500 starts at step 501, with accessing one or more elements determined to be menu elements. The determined elements may be inputs of flow diagram 500. At step 502, it is determined whether the webpage includes W3C instructions for a preferred menu mapping of the determined menu elements. If the webpage includes instructions for a preferred menu mapping, then the menu elements may be mapped according to the instructions.

At step 504, a mapping of menu elements may be interpreted from HTML properties associated with the webpage. Webpage HTML elements may be used to dictate a precise mapping of menu elements. If HTML properties do not yield an appropriate mapping, then at step 506, a mapping of menu elements may be interpreted from CSS attributes of the webpage. CSS layout techniques of a webpage may be determined and interpreted for XR menu interfaces. As an example and not by way of limitation, a CSS grid and a flexbox attribute may define layout attributes of menu elements on a webpage. The CSS flexbox attribute 'flex-direction: row' may be interpreted to mean that associated objects may be aligned in a row. The CSS grid attribute may define a layout of a plurality of objects as a grid. The CSS grid attribute 'Grid-row' property may be interpreted to align menu elements in a row. Additional CSS attributes, such as display, float, and position, may be further interpreted. If there are no mapping instructions associated with the webpage, then at step 508, a default ordering of menu elements may be followed. The default ordering may comprise interpreting menu elements as a list and mapping the list either horizontally or vertically based on a pre-determined XR menu layout. The mapping steps 502-508 may be repeated for each of the one or more determined menu elements of a webpage. At step 510, the determined mapping information may be stored. At step 512, the menu elements may be mapped to the XR reader interface based on the determined mapping from steps 502-508. At step 514, a focus of the user may be determined.

As an example and not by way of limitation, the menu elements may be mapped to a virtual menu superimposed onto a position corresponding to the user's hand. A virtual menu mapped onto a user's hand allows the user to navigate the webpage via the XR web reader in situations where physical movement of the user is limited. Menu elements may be ordered according to a likelihood of use of commands associated, such that the user may perform the simplest movement to interact with a most used menu element.

Figure 6:
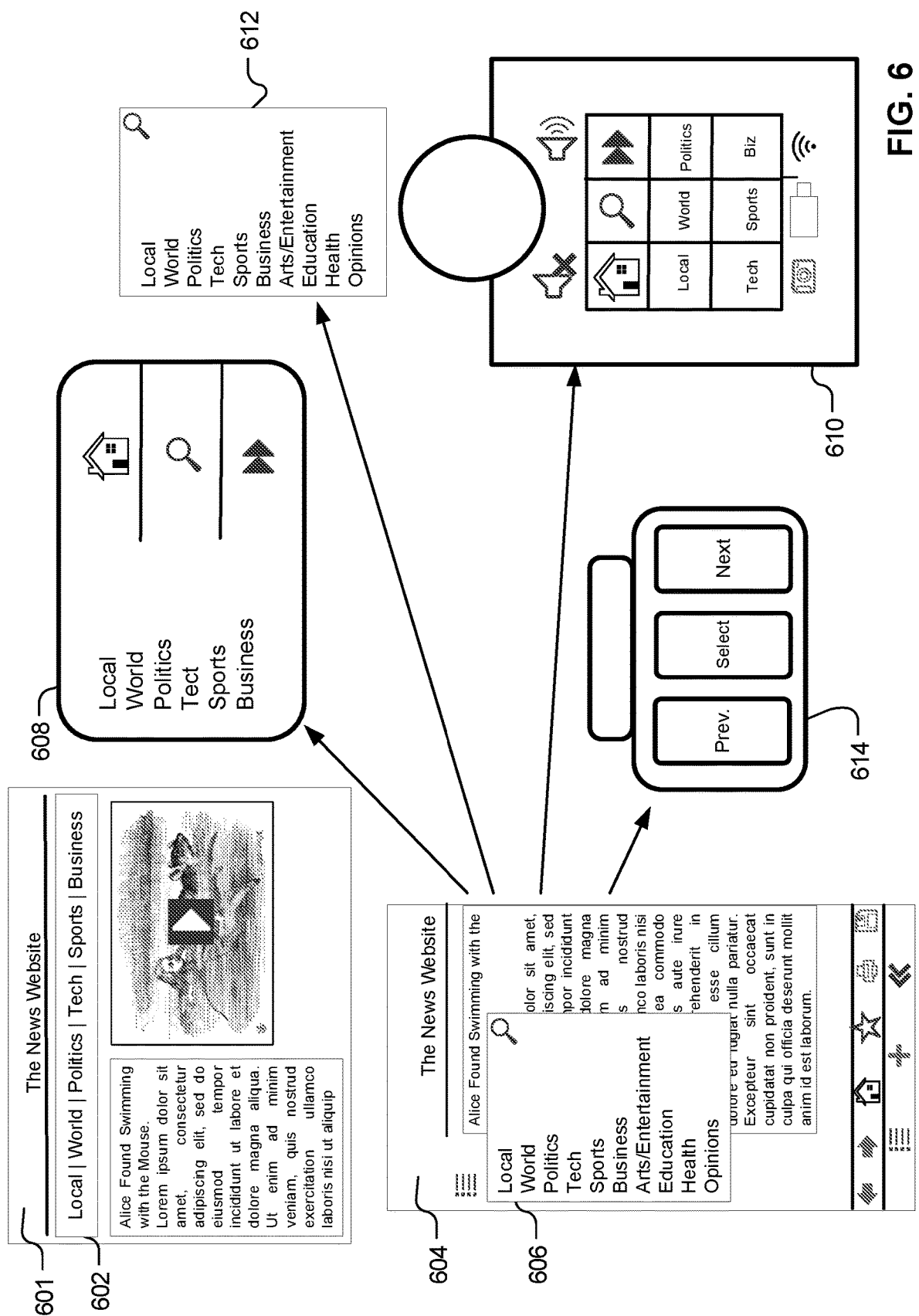
FIG. 6 illustrates an example mapping of identified menu elements to a plurality of pre-determined menu interfaces.

FIG. 6 illustrates a plurality of example mappings of identified menu elements to a plurality of pre-determined menu interfaces. A webpage 601 may comprise one or more menu elements and one or more content elements. Menu element 602 may be determined to be a header menu element. Menu element 606 may be determined to be a sub-menu list menu element comprising one or more items. In particular embodiments, the one or more items may be interactable such that one or more content elements accessible via the webpage are accessible via the items in the list menu element. As shown in FIG. 6, list menu element 606 may be mapped to one or more menu interfaces 608, 610, 612, or 614 comprising one or more configurations for navigating the webpage according to the determined menu elements. As an example and not by way of limitation, list menu element 606 may be extracted and presented as menu interface 612 by maintaining the structure and arrangement of the items in the list menu element. As another example and not by way of limitation, list menu element 606 may be presented as an array of grid buttons each corresponding to one of the items in the list menu element. As an example and not by way of limitation, list menu element 606 may be mapped to pre-determined menu interface 614 such that one or more content elements accessible via the list menu elements may be iteratively selected. As an example and not by way of limitation, the list menu element "Tech" may be selected. Using controls on menu interface 614, the user may navigate to the next consecutive content element accessible via the next consecutive list menu element. I.e., when the list menu element "Tech" is selected, the user may select the control "Next" on menu interface 614 to navigate to the list menu element "Sports." Similarly, the user may select the control "Prev." on menu interface 614 to navigate to the list menu element "Politics."

Figure 7:
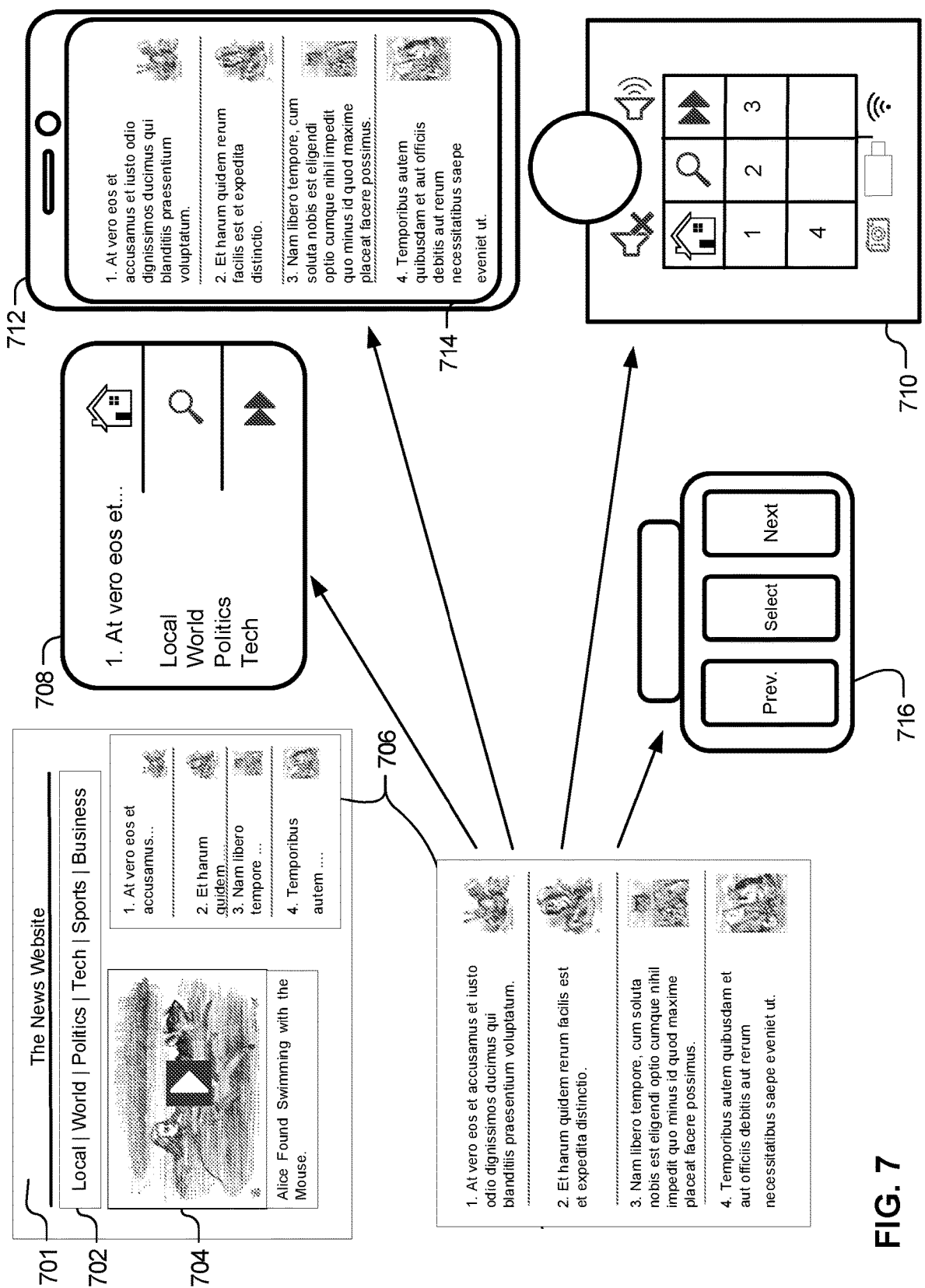
FIG. 7 illustrates an example mapping of identified menu elements to a plurality of pre-determined menu interfaces.

FIG. 7 illustrates an example mapping of identified menu elements to a plurality of pre-determined menu interfaces. In particular embodiments, a webpage 701 may include one or more candidate elements 702, 704, and 706. In particular embodiments, candidate element 702 may be determined to be a menu element. In particular embodiments, candidate element 704 may be determined to be a content element comprising video content accessible via webpage 701. In particular embodiments, candidate element 706 may be determined to be a menu element. In FIG. 7, menu interfaces 708, 710, 714, and 716 illustrate exemplary configurations for mapping the determined menu element 706 such that a user may control content elements via the menu interfaces. As an example and not by way of limitation, menu element 706 may be mapped to menu interface 714 on a mobile computing device 712, as shown in FIG. 7.

Figure 8:
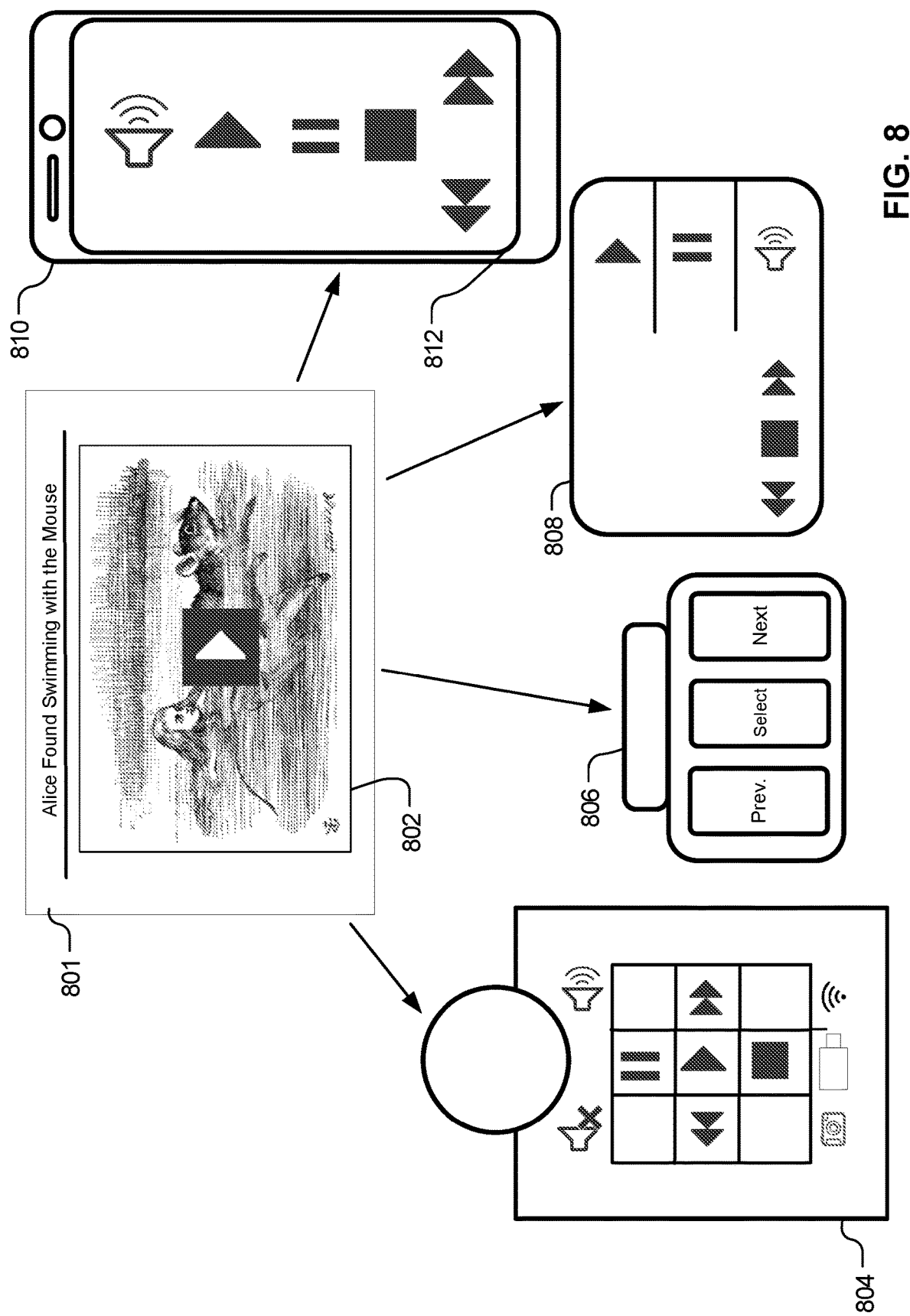
FIG. 8 illustrates an example mapping of a video menu element to a plurality of pre-determined menu interfaces.

FIG. 8 illustrates an example mapping of a video menu element to a plurality of pre-determined menu interfaces. In particular embodiments, a webpage 801 may include a video 802. Video 802 may be controlled via video control menu elements comprising a plurality of video commands. Menu interfaces 804, 806, 808, and 812 each illustrate a predefined menu interface for mapping the video control menu elements. As an example and not by way of limitation, video 802 may be mapped to menu interface 812 on a mobile computing device 810, as shown in FIG. 8.

In particular embodiments, the webpage DOM may be parsed and the content elements and menu elements of the webpage may be determined by a machine-learning model that has been trained on a training set of pre-labeled webpages. The machine learning model may have been trained on a training set of webpages. In particular embodiments, the training set of webpages may be pre-labelled. Pre-labelling may comprise marking the one or more DOM elements which comprise parent elements and which may encompass all menu elements according to a DOM hierarchy structure. Marking the parent DOM elements make determining menu elements easier. This model of machine learning may be called supervised learning or reinforcement learning for classifying web elements on a webpage. In particular embodiments, the input of the machine learning algorithm may be a set of training webpages comprising the most visited websites. In particular embodiments, the output of the machine learning algorithm may be used to label additional webpages. In particular embodiments, the machine learning algorithm may be unable to correctly determine a webpage menu. A DOM mutation observer may be attached to a training webpage to determine proper detection of a webpage menu. A DOM mutation observer may be a coding feature attached to a particular element of a parsed DOM, and may detect changes in or interactions with the DOM, such as detecting a machine learning algorithm's determination of menu elements. As an example and not by way of limitation, if a drop down menu was not detected by the machine learning algorithm, the observer may detect the menu when a user interacts with the menu. In this example, the observer may detect menu focus as a result of the HTML and CSS properties changing upon a change of focus.

In particular embodiments, a focus of a user of the XR web reader may be determined. Based on the focus of the user, characteristics of one or more pre-defined menu interfaces may be adjusted. As an example, content elements of a webpage may be presented on one or more first layers of an interface of the XR web reader, while menu elements of the webpage may be mapped to one or more pre-defined menu interfaces, and the one or more pre-defined menu interfaces presented on one or more second layers of the XR web reader. The characteristics of the pre-defined menu interfaces may include visibility or position. In particular embodiments, the visibility or position of one or more menu interfaces may change based on a determined focus of the user. As an example and not by way of limitation, a visibility of the pre-defined menu interfaces may be in a first state of visibility, wherein the first state comprises one or more of the menu interfaces being out of view, transparent, semi-transparent, minimized, or collapsed. As an example and not by way of limitation, a menu interface of video content accessible via the webpage may be in a first state of visibility, wherein the first state comprises the menu interface being out of view. The video content in this example may be presented on a first layer of the interface, and the menu interface may be presented on a second layer behind the first layer such that the menu interface on the second layer is out of view. On a determination that of user focus on the video content, the visibility of the menu interface on the second layer may switch to a second state of visibility, wherein the second state of visibility comprises the menu interface being in view. As an alternative, the menu interface may initially be transparent (low visibility) and the visibility may change such that the menu interface is opaque (high visibility) based on a determination of user focus on the video content. As another example, the presentation of the webpage may show a first menu interface for a first content element and a second menu interface for a second content element.

Figure 9:
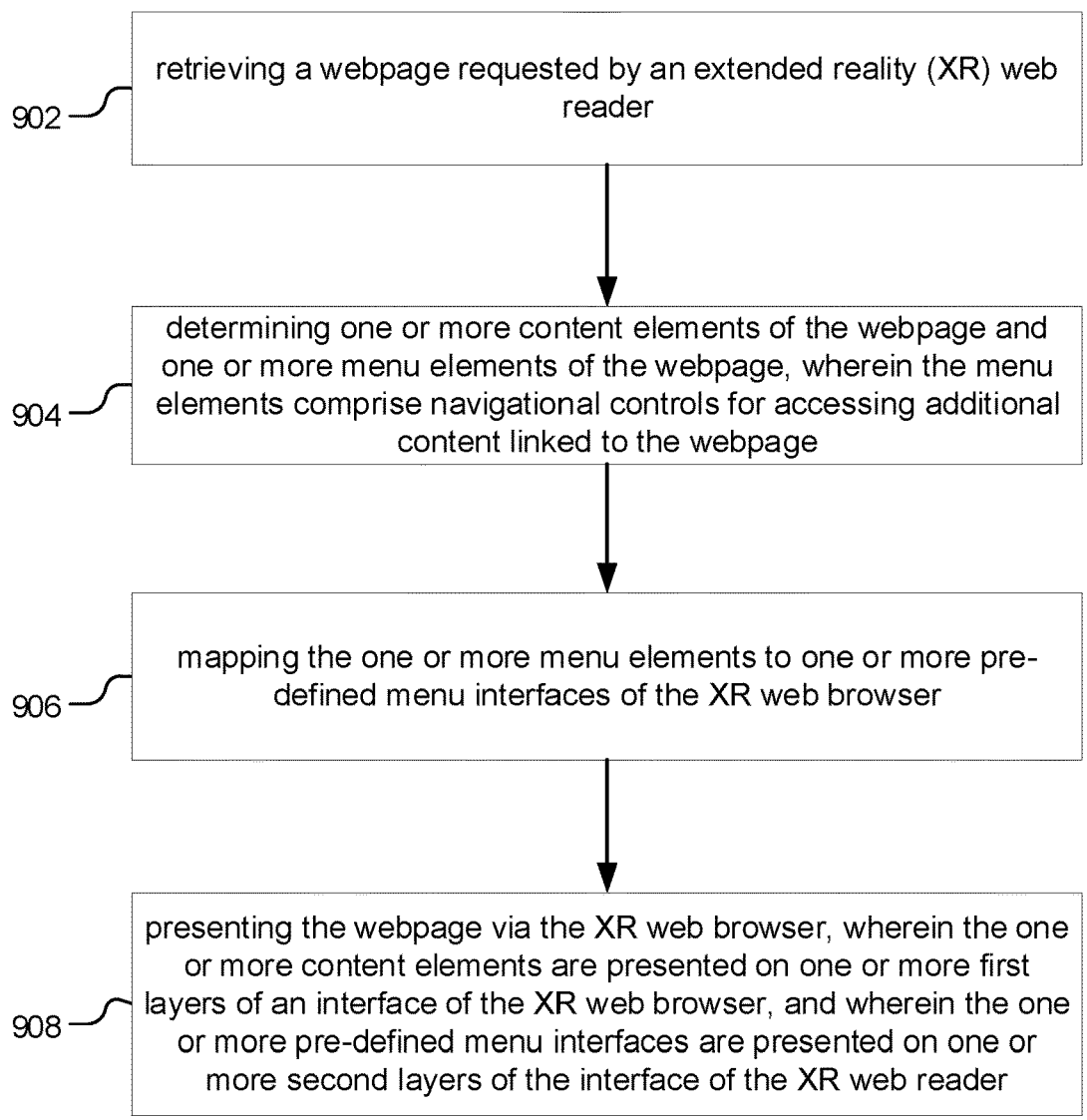
FIG. 9 illustrates a workflow diagram for a method of presenting a webpage via an XR web reader.

FIG. 9 illustrates a workflow diagram for a method 900 of presenting a webpage via an XR web reader. At step 902, a webpage requested by an extended reality (XR) web reader is retrieved. Then, at step 904, it is determined one or more content elements of the webpage and one or more menu elements of the webpage, wherein the menu elements comprise navigational controls for accessing additional content linked to the webpage. Then, at step 906, the one or more menu elements are mapped to one or more pre-defined menu interfaces of the XR web reader. At step 908, the webpage is presented via the XR web reader, wherein the one or more content elements are presented on one or more first layers of an interface of the XR web reader, and wherein the one or more pre-defined menu interfaces are presented on one or more second layers of the interface of the XR web reader. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for presenting a webpage via an XR web reader including the particular steps of the method of FIG. 9, this disclosure contemplates any suitable method for presenting a webpage via an XR web reader including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
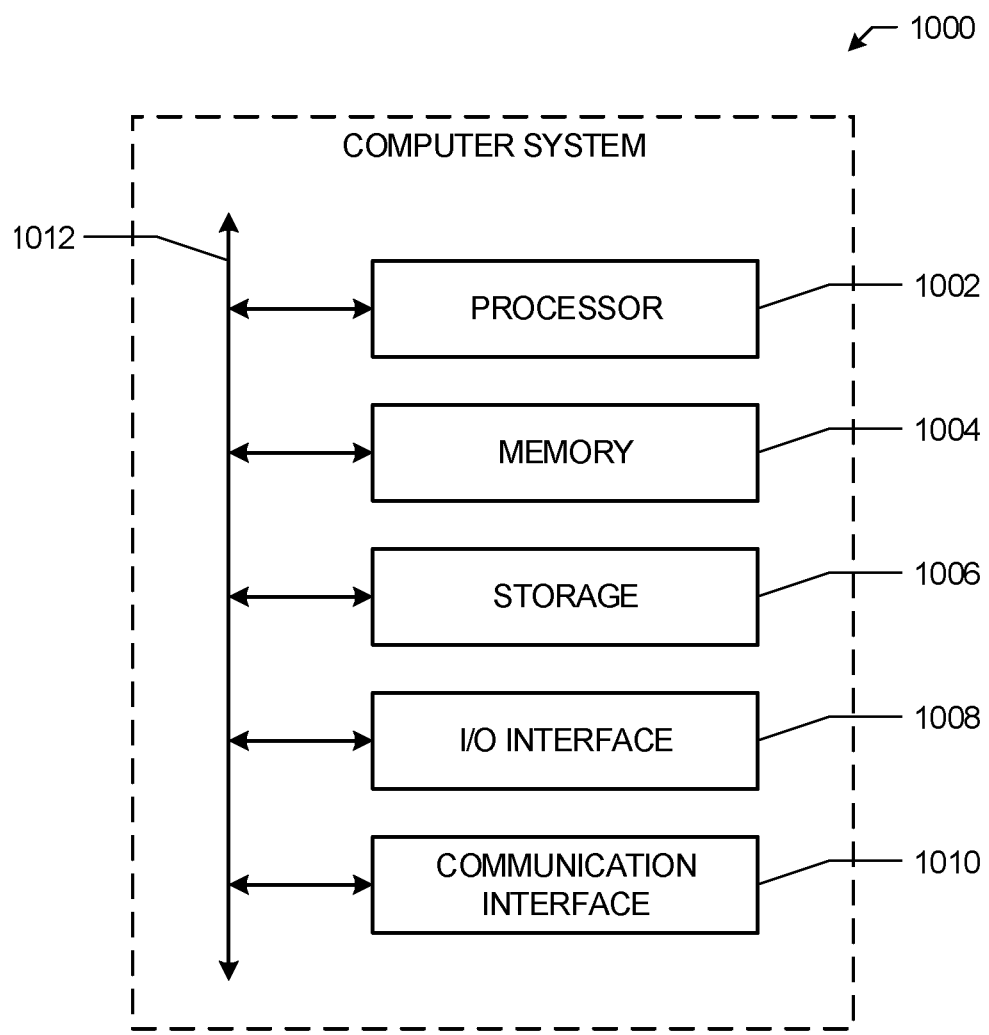
FIG. 10 illustrates an example computer system.

FIG. 10 illustrates an example computer system 1000 that may be utilized for extracting elements from webpages for presenting the webpage via an XR web reader, in accordance with the presently disclosed embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1006 for them. Where appropriate, I/O interface 1008 may include one or more device or software drivers enabling processor 1002 to drive one or more of these I/O devices. I/O interface 1008 may include one or more I/O interfaces 1006, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it.

As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:
1. A method comprising, by a computing system:
 retrieving a webpage requested by an extended reality (XR) web reader;

determining one or more content elements of the webpage and one or more menu elements of the webpage, wherein the menu elements comprise navigational controls for accessing additional content linked to the webpage;

mapping the one or more menu elements comprising navigational controls for accessing additional content linked to the webpage to one or more pre-defined menu interfaces of the XR web reader; and presenting the webpage via the XR web reader, wherein the one or more content elements are presented on one or more first layers of an interface of the XR web reader, and wherein the one or more pre-defined menu interfaces are presented on one or more second layers of the interface of the XR web reader.

2. The method of claim 1, further comprising:
determining a focus of a user of the XR web reader; and
modifying, based on the focus of the user, characteristics of the one or more pre-defined menu interfaces.

3. The method of claim 2, wherein the characteristics of the one or more pre-defined menu interfaces comprise one or more of a visibility of the menu interface or a position of the menu interface.

4. The method of claim 2, wherein determining a focus of the user is based on one or more of:
a gaze of the user;
a head position of the user; or
a gesture of the user.

5. The method of claim 1, wherein determining one or more content elements of the webpage and one or more menu elements of the webpage comprises:
accessing a document object model (DOM) of the webpage;
parsing the DOM to identify one or more candidate elements; and
categorizing each of the one or more candidate elements into either a content element or a menu element based on one or more of:
a position of the candidate element;
a height to width ratio of the candidate element;
one or more HTML tags associated with the candidate element;
one or more HTML role attributes of the candidate element;
one or more HTML tabindex attributes of the candidate element; or
a parent-child relationship of the candidate element with one or more other candidate elements.

6. The method of claim 5, wherein the one or more candidate elements are collected using a breadth first search (BFS) algorithm.

7. The method of claim 1, wherein determining one or more content elements of the webpage and one or more menu elements of the webpage comprises:
accessing a document object model (DOM) of the webpage;
parsing the DOM to identify one or more candidate elements;
determining that the one or more candidate elements cannot be categorized into either contents or menu elements;
retrieving one or more comparison webpages within the same domain as the webpage requested by the XR web reader;
accessing the DOM of each of the one or more comparison webpages;
parsing the DOM of each of the one or more comparison webpages to collect one or more comparison elements of each of the one or more comparison webpages;
comparing the one or more candidate elements of the webpage requested by the XR reader to each of the one or more comparison elements of the one or more comparison webpages; and
determining, based on the comparison, the one or more menu elements, wherein the one or more menu elements are candidate elements that are common to one or more of the comparison webpages and to the webpage requested by the XR web reader.

8. The method of claim 1, wherein the one or more menu elements are mapped to the one or more pre-defined menu interfaces based on one or more CSS properties of the menu elements of the webpage or one or more W3C extensions defining the one or more pre-defined menu interfaces.

9. A system comprising:
one or more displays;
one or more non-transitory computer-readable storage media including instructions; and
one or more processors coupled to the storage media, the one or more processors configured to execute the instructions to:
retrieve a webpage requested by an extended reality (XR) web reader;
determine one or more content elements of the webpage and one or more menu elements of the webpage, wherein the menu elements comprise navigational controls for accessing additional content linked to the webpage;
map the one or more menu elements comprising navigational controls for accessing additional content linked to the webpage to one or more pre-defined menu interfaces of the XR web reader; and
present, on the one or more displays, the webpage via the XR web reader, wherein the one or more content elements are presented on one or more first layers of an interface of the XR web reader, and wherein the one or more pre-defined menu interfaces are presented on one or more second layers of the interface of the XR web reader.

10. The system of claim 9, wherein the one or more processors are further configured to execute the instructions to:
determine a focus of a user of the XR web reader; and
modify, based on the focus of the user, characteristics of the one or more pre-defined menu interfaces.

11. The system of claim 10, wherein the characteristics of the one or more pre-defined menu interfaces comprise one or more of a visibility of the menu interface or a position of the menu interface.

12. The system of claim 9, wherein the instructions to determine one or more content elements of the webpage and one or more menu elements of the webpage comprise instructions to:
access a document object model (DOM) of the webpage;
parse the DOM to identify one or more candidate elements; and
categorize each of the one or more candidate elements into either a content element or a menu element based on one or more of:
a position of the candidate element;
a height to width ratio of the candidate element;
one or more HTML tags associated with the candidate element;

one or more HTML role attributes of the candidate element;
one or more HTML tabindex attributes of the candidate element; or
a parent-child relationship of the candidate element with one or more other candidate elements.

13. The system of claim 9, wherein the instructions to determine one or more content elements of the webpage and one or more menu elements of the webpage comprise instructions to:
access a document object model (DOM) of the webpage;
parse the DOM to identify one or more candidate elements;
determine that the one or more candidate elements cannot be categorized into either contents or menu elements;
retrieve one or more comparison webpages within the same domain as the webpage requested by the XR web reader;
access the DOM of each of the one or more comparison webpages;
parse the DOM of each of the one or more comparison webpages to collect one or more comparison elements of each of the one or more comparison webpages;
compare the one or more candidate elements of the webpage requested by the XR reader to each of the one or more comparison elements of the one or more comparison webpages; and
determine, based on the comparison, the one or more menu elements, wherein the one or more menu elements are candidate elements that are common to one or more of the comparison webpages and to the webpage requested by the XR web reader.

14. The system of claim 9, wherein the one or more menu elements are mapped to the one or more pre-defined menu interfaces based on one or more CSS properties of the menu elements of the webpage or one or more W3C extensions defining the one or more pre-defined menu interfaces.

15. A non-transitory computer-readable medium comprising instructions that, when executed by one or more processors of an electronic device, cause the one or more processors to:
retrieve a webpage requested by an extended reality (XR) web reader;
determine one or more content elements of the webpage and one or more menu elements of the webpage, wherein the menu elements comprise navigational controls for accessing additional content linked to the webpage;
map the one or more menu elements comprising navigational controls for accessing additional content linked to the webpage to one or more pre-defined menu interfaces of the XR web reader; and
present the webpage via the XR web reader, wherein the one or more content elements are presented on one or more first layers of an interface of the XR web reader, and wherein the one or more pre-defined menu interfaces are presented on one or more second layers of the interface of the XR web reader.

16. The non-transitory computer-readable medium of claim 15, further comprising instructions that, when executed by the one or more processors of the electronic device, cause the one or more processors to:
determine a focus of a user of the XR web reader; and
adjust, based on the focus of the user, characteristics of the one or more pre-defined menu interfaces.

17. The non-transitory computer-readable medium of claim 16, wherein the characteristics of the one or more pre-defined menu interfaces comprise one or more of a visibility of the menu interface or a position of the menu interface.

18. The non-transitory computer-readable medium of claim 15, wherein the instructions to determine one or more content elements of the webpage and one or more menu elements of the webpage comprise instructions to:
access a document object model (DOM) of the webpage;
parse the DOM to identify one or more candidate elements; and
categorize each of the one or more candidate elements into either a content element or a menu element based on one or more of:
a position of the candidate element;
a height to width ratio of the candidate element;
one or more HTML tags associated with the candidate element;
one or more HTML role attributes of the candidate element;
one or more HTML tabindex attributes of the candidate element; or
a parent-child relationship of the candidate element with one or more other candidate elements.

19. The non-transitory computer-readable medium of claim 15, wherein the instructions to determine one or more content elements of the webpage and one or more menu elements of the webpage comprise instructions to:
access a document object model (DOM) of the webpage;
parse the DOM to identify one or more candidate elements;
determine that the one or more candidate elements cannot be categorized into either contents or menu elements;
retrieve one or more comparison webpages within the same domain as the webpage requested by the XR web reader;
access the DOM of each of the one or more comparison webpages;
parse the DOM of each of the one or more comparison webpages to collect one or more comparison elements of each of the one or more comparison webpages;
compare the one or more candidate elements of the webpage requested by the XR reader to each of the one or more comparison elements of the one or more comparison webpages; and
determine, based on the comparison, the one or more menu elements, wherein the one or more menu elements are candidate elements that are common to one or more of the comparison webpages and to the webpage requested by the XR web reader.

20. The non-transitory computer-readable medium of claim 15, wherein the one or more menu elements are mapped to the one or more pre-defined menu interfaces based on one or more CSS properties of the menu elements of the webpage or one or more W3C extensions defining the one or more pre-defined menu interfaces.

* * * * *